(12) United States Patent
Watanabe

(10) Patent No.: US 6,765,895 B1
(45) Date of Patent: *Jul. 20, 2004

(54) SPECTRUM SPREAD COMMUNICATION SYSTEM

(75) Inventor: Masatoshi Watanabe, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,357

(22) Filed: Sep. 14, 2000

Related U.S. Application Data

(63) Continuation of application No. 08/820,363, filed on Mar. 12, 1997, now Pat. No. 6,195,343.

(30) Foreign Application Priority Data

Mar. 15, 1996 (JP) .......................................... P. 8-59712
Jul. 29, 1996 (JP) ......................................... P. 8-198213

(51) Int. Cl.[7] .............................................. H04B 7/216
(52) U.S. Cl. ...................................... 370/335; 370/342
(58) Field of Search ................................ 370/315, 320, 370/324, 328, 329, 331, 335, 342–345, 350, 503, 506–512, 514–516, 441, 318; 375/140–141, 145–147, 149; 455/422, 426, 450–452, 500, 501, 507, 509–514, 517, 524, 525

(56) References Cited

U.S. PATENT DOCUMENTS

| | | |
|---|---|---|
| 4,485,477 A | 11/1984 | Nossen |
| 4,901,307 A | 2/1990 | Gilhousen et al. |
| 4,969,159 A | 11/1990 | Belcher et al. |
| 5,103,459 A | 4/1992 | Gilhousen et al. |
| 5,359,624 A | 10/1994 | Lee et al. |
| 5,495,509 A | 2/1996 | Lundquist |
| 5,511,067 A | 4/1996 | Miller |
| 5,517,675 A | 5/1996 | O'Conner et al. |
| 5,568,472 A | 10/1996 | Umeda et al. |
| 5,631,922 A | 5/1997 | Sekine et al. |
| 5,666,352 A | 9/1997 | Ohgoshi et al. |
| 5,673,260 A | 9/1997 | Umeda et al. |
| 5,682,172 A | 10/1997 | Sugita et al. |
| 5,696,762 A | 12/1997 | Natali et al. |
| 5,850,392 A | 12/1998 | Wang et al. |
| 5,910,948 A * | 6/1999 | Shou et al. .................. 370/331 |
| 5,991,330 A | 11/1999 | Dahlman et al. |
| 6,038,250 A * | 3/2000 | Shou et al. .................. 370/335 |
| 6,493,563 B1 * | 12/2002 | Ozluturk et al. ............ 455/522 |

FOREIGN PATENT DOCUMENTS

| | | |
|---|---|---|
| EP | 0 586 090 A1 | 3/1994 |
| EP | 0 678 991 A2 | 10/1995 |

* cited by examiner

*Primary Examiner*—Dang Ton
(74) *Attorney, Agent, or Firm*—Pearne & Gordon LLP

(57) ABSTRACT

In base station side equipment, a control channel for transmitting control information and a communication channel for transmitting information to each mobile station are spread with different synchronizing codes before being superposed by operating a switch to switch the output of an adder over to the output of a synchronizing code generator. Further, a synchronizing code is periodically inserted in a signal by one symbol length and the signal is transmitted over the superposed channel. In a plurality of base station side equipment, moreover, the synchronizing code and its transmission period are equal and the transmission timing is asynchronous and independent. A synchronizing correlator in mobile station side equipment obtains the correlation value of the whole chip phase in a synchronizing code transmission period using the synchronizing code and decides a base station which is transmitting the synchronizing code at the greatest correlating peak position to the closest one and further extracts symbol timing from the peak position.

5 Claims, 9 Drawing Sheets

27; DELAY WAVE COMPONENT

POWER

OUTPUT OF CORRELATOR

TIME

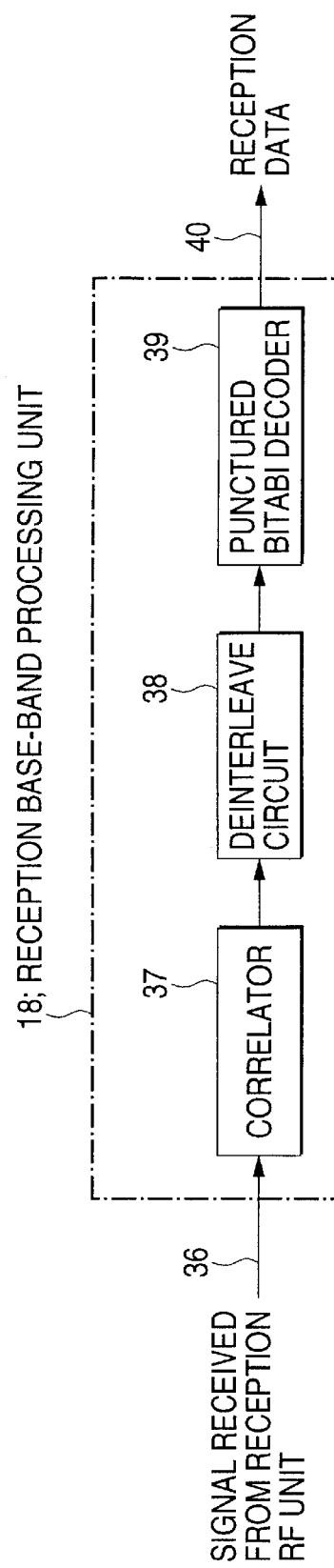

SPECTRUM SPREAD COMMUNICATION SYSTEM

CROSS-REFERENCE TO RELATED APPLICATION

The present application is a continuation of U.S. patent application Ser. No. 08/820,363 filed Mar. 12, 1997, now U.S. Pat. No. 6,195,343.

BACKGROUND OF THE INVENTION

1. Field of the Invention

The present invention relates to a spectrum spread communication system for used in a digital automobile telephone system, a digital cellular telephone system, personal communication services (PCS) and the like.

2. Description of the Related Art

A spectrum spread communication system is a transmission system in which information is transmitted to be spread into a sufficiently wide band in comparison with minimum necessary band width. Further, this system is a communication system having excellent conversational secrecy, official secrecy and non-interference. A direct spread (DS) system is a spectrum spread communication system in which information is directly multiplied by a spread code.

In a cellular radio communication system such as an automobile telephone, a cellular telephone and the like, an FDMA (Frequency Division Multiple Access) system, a TDMA (Time Division Multiple Access) system and the like are known as multi-dimensional access technology when a plurality of stations simultaneously communicate with one another in the same frequency zone. A CDMA (Code Division Multiple Access) system using the spectrum spread communication system is advantageous in that high efficiency of frequency utilization can be obtained in comparison with any other technology and that more users are accommodatable.

In the CDMA system, it is effective to use codes having higher orthogonality as spread codes to increase capacity. However, Walsh codes and orthogonal Gold codes are known as those having high orthogonality but the number of them is limited to the same number of code lengths. Therefore, in order to secure the number of spread codes to be allotted to users, U.S. Pat. No. 5,103,459 discloses to combine short codes the period of which is equal to the symbol length of information,and long codes the period of which is greater than the former to be used. In this case, a long code used at one base station is one code in the forward link, and different long codes are allocated to respective base stations. Accordingly, the orthogonality of the whole user within the same cell can be maintained, and since a signal in any other cell is spread with a different long code, the signal is become noise to thereby suppress interference. In such a system using the long code, the mobile station is required to acquire and hold long code synchronization to keep in communication.

In the cellular system, when the power supply of the mobile station is turned on, when the communication between the mobile station and the base station is broken, or when the mobile station conducts a handover to specify a base station to be switched for changing the base station to be communicated from one to another accompanying with its position change during communication, the mobile station has to specify which base station is closest at present and is under best condition to communicate.

In the cellular system using the CDMA system, U.S. Patent discloses a conventional method to conduct long code synchronization and a call range decision, in which all of the base stations offset the pilot channel spread with the same long code and transmit the offset pilot channel so as not to be consistent with the phase (timing) of a spread code, and the mobile station correlatively detects the whole phase of spread code of the received pilot channel so as to specify a base station with the phase at the highest correlation value as the closest one. However, it is required in this system that synchronization has been obtained between the base stations, and it is necessary to distribute timing as a reference at the whole base stations. Moreover, the phase of a selectable long code is restricted and when the number of base stations is increased, the offset of a base station to be newly installed has to be selected so as to prevent overlapping in consideration of the long code offset values of the surrounding base stations and installation design becomes necessitated. Accordingly, this system is not fit for an inter-cell asynchronous system wherein installation design is unnecessary and wherein installation of new base stations can be dealt with flexibly in view of an increase in traffic and so forth.

Since the aforementioned conventional system is intended to acquire initial synchronization using the pilot channel superposed on any other user channel, more integration time is required when the correlation of the pilot channel is detected in order to not only suppress the interference component derived from other users but also raise the reliability of the correlation value. Consequently, time required for the initial synchronization is increased. Although it may be attempted to shorten the time required for the initial synchronization by increasing the power of the pilot channel, the pilot channel tends to interfere with other channels often and thus communication quality is deteriorated.

SUMMARY OF THE INVENTION

It is an object of the present invention to provided a spectrum spread communication system in which a mobile station quickly obtains initial synchronization and makes a call range decision so as to be capable of acquiring long code synchronization even in the CDMA system which does not need no inter-cell synchronization.

A spectrum spread communication system according to the present invention comprises: a plurality of base stations and a plurality of mobile stations having communication means using a direct spread CDMA (Code Division Multiple Access) method as a multi-dimensional access method, the base station having synchronizing code transmission means for periodically transmitting a synchronizing code with a specific spread code the length of which is integer times as great as transmission symbol length as the synchronizing code, the mobile station having means for acquiring symbol synchronization of the base station by detecting the correlation of the synchronizing code.

According to the present invention, since the synchronizing code transmission section is not transmitted to other channels, no interference to the synchronizing code occurs in the cell and integration time can be shortened when the mobile station detects the correlation with the effect of making possible the quick acquisition of symbol synchronization. Since the synchronizing code is prevented from interfering any other channel like wise, transmission power is increasable with the effect of also making possible the quick acquisition of symbol synchronization.

BRIEF DESCRIPTION OF THE DRAWINGS

In the accompanying drawings:

FIG. 10 is a block diagram illustrating a reception base-band processing unit at the base station according to the embodiment 4 of the invention.

PREFERRED EMBODIMENTS OF THE INVENTION

Preferred embodiments of the present invention will be described as follow by reference to the accompanying drawings.

Embodiment 1

Figure 1:
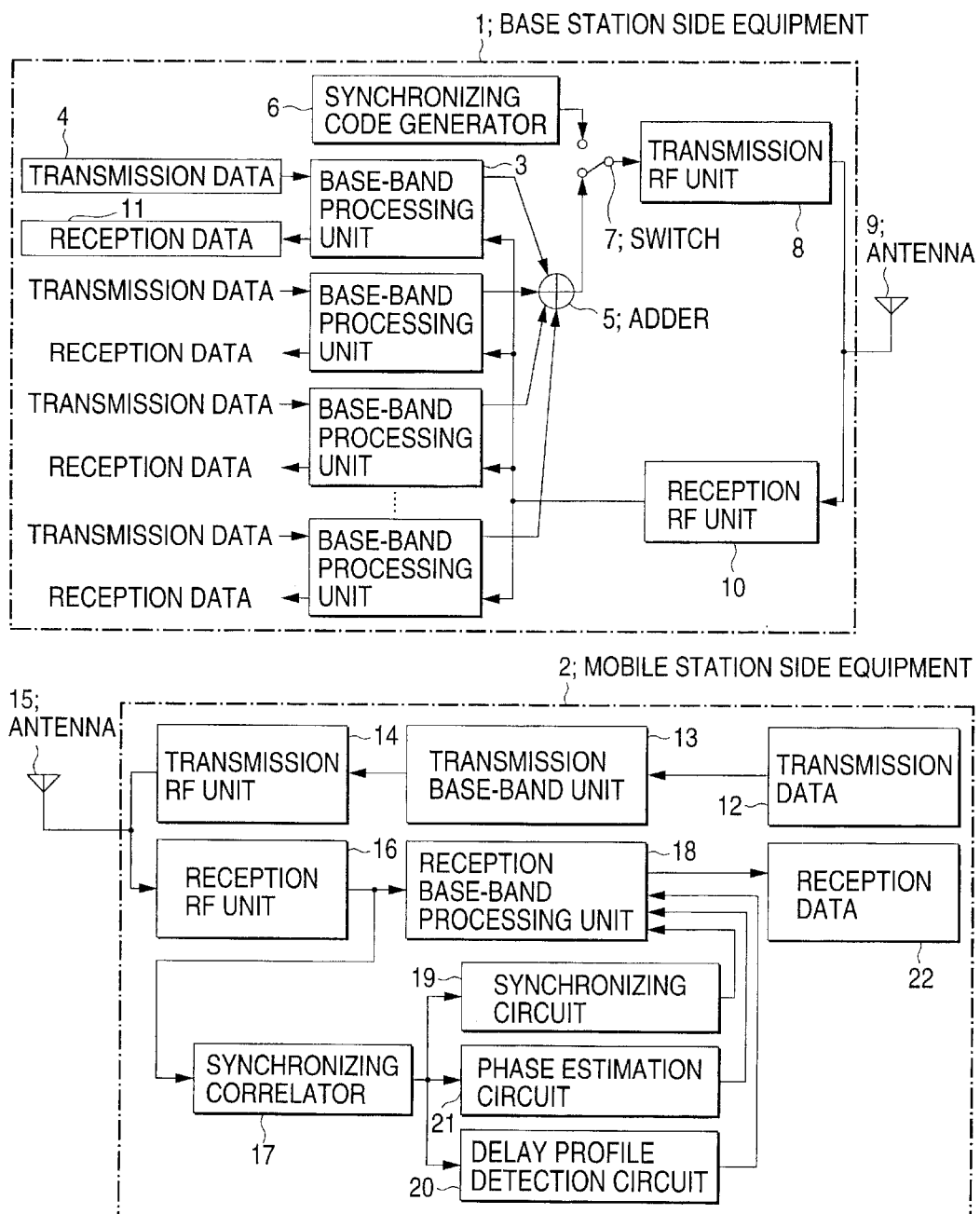
FIG. 1 is a block diagram illustrating the configuration of a spectrum spread communication system according to embodiments 1, 2, 3 and 4 of the invention.

FIG. 1 is a diagram showing the construction of a spectrum spread communication system as a first embodiment of the invention. In FIG. 1, reference numeral 1 denotes a base station side equipment 1; and 2, a mobile station side equipment 2. As the base station simultaneously holds communication with a plurality of mobile stations in a cellular system, the base station side equipment 1 is provided with a plurality of base-band processing units 3 corresponding to a maximum number of mobile stations with which the base station to can communicates. Further, reference numeral 4 denotes transmission data to be transferred to a mobile station. When the data is input to the base-band processing unit 3, encoding, frame assembling and a spread process using spread codes different for each mobile station are carried out and the results are input to an adder 5. The adder 5 adds up outputs from a plurality of base-band processing units 3 and forwards the added result to a switch 7. Further, reference numeral 6 denotes a synchronizing code generator 6 for supplying a synchronizing code to the switch 7. The switch 7 changes the output of the adder 5 to the output of synchronizing code generator 6 and vice versa and supplies one of the outputs thereof to a transmission RF unit 8. The transmission RF unit 8 subjects the input to modulation, frequency conversion and amplification, and then transmits the result to a radio propagation path from an antenna 9. At the time of reception, the antenna 9 receives signals having been superposed in the radio propagation path from the plurality of mobile stations, and supplies the signal to a reception RF unit 10. The reception RF unit .10 subjects the superposed received signal to frequency conversion, an AGC process and demodulation, and then supplies the result to the plurality of base-band processing units 3. Each base-band processing unit 3 selects the signal addressed to itself from the outputs of the reception RF unit by performing a correlation process using spread codes different for each mobile station and further subjects the signal to detection, RAKE synthesis and decoding so as to obtain reception data 11.

On the other hand, the mobile station side equipment 2 is provided with a transmission base-band unit 13 for subjecting transmission data 12 to encoding, frame assembling and the spread process using the spread codes different for each mobile station, and the result is input to a transmission RF unit 14. The transmission RF unit subjects the input to modulation, frequency conversion and amplification and transmits the result to the radio propagation path from an antenna 15. At the time of reception, the antenna 15 receives signals from the base station and supplies the signal to a reception RF unit 16. The reception RF unit 16 subjects the superposed zeroed received signal to frequency conversion, the AGC process and demodulation, and then supplies the result to a synchronizing correlator 17 and a reception base-band processing unit 18. The synchronizing correlator 17 detects a correlation value in the whole chip phase of the received signal using a synchronizing code or the spread code addressed to itself, and then supplies the detected result to a synchronizing circuit 19, a delay profile detection circuit 20 and a phase estimation circuit 21. The synchronizing circuit 19 detects the symbol timing of the received signal from the input, and supplies the detected result to the reception base-band processing unit 18. Further, the delay profile detection circuit 20 detects the delay profile of the radio propagation path from the input, and supplies the detected result to the reception base-band processing unit 18. Moreover, the phase estimation circuit 21 detects the phase angle of the carrier of each delay wave component of the delay profile from the received signal, and supplies the detected result to the reception base-band processing unit 18. The reception base-band processing unit 18 separates the signal addressed to itself on a delay wave component basis by performing the correlation process using the spread codes different for each mobile station from the reception RF unit 16, and makes wave detection using the separated result and the output from the phase estimation circuit 21, and further performs not only RAKE synthesis for synthesizing the delay wave components but also decoding so as to obtain reception data 22.

Figure 2:
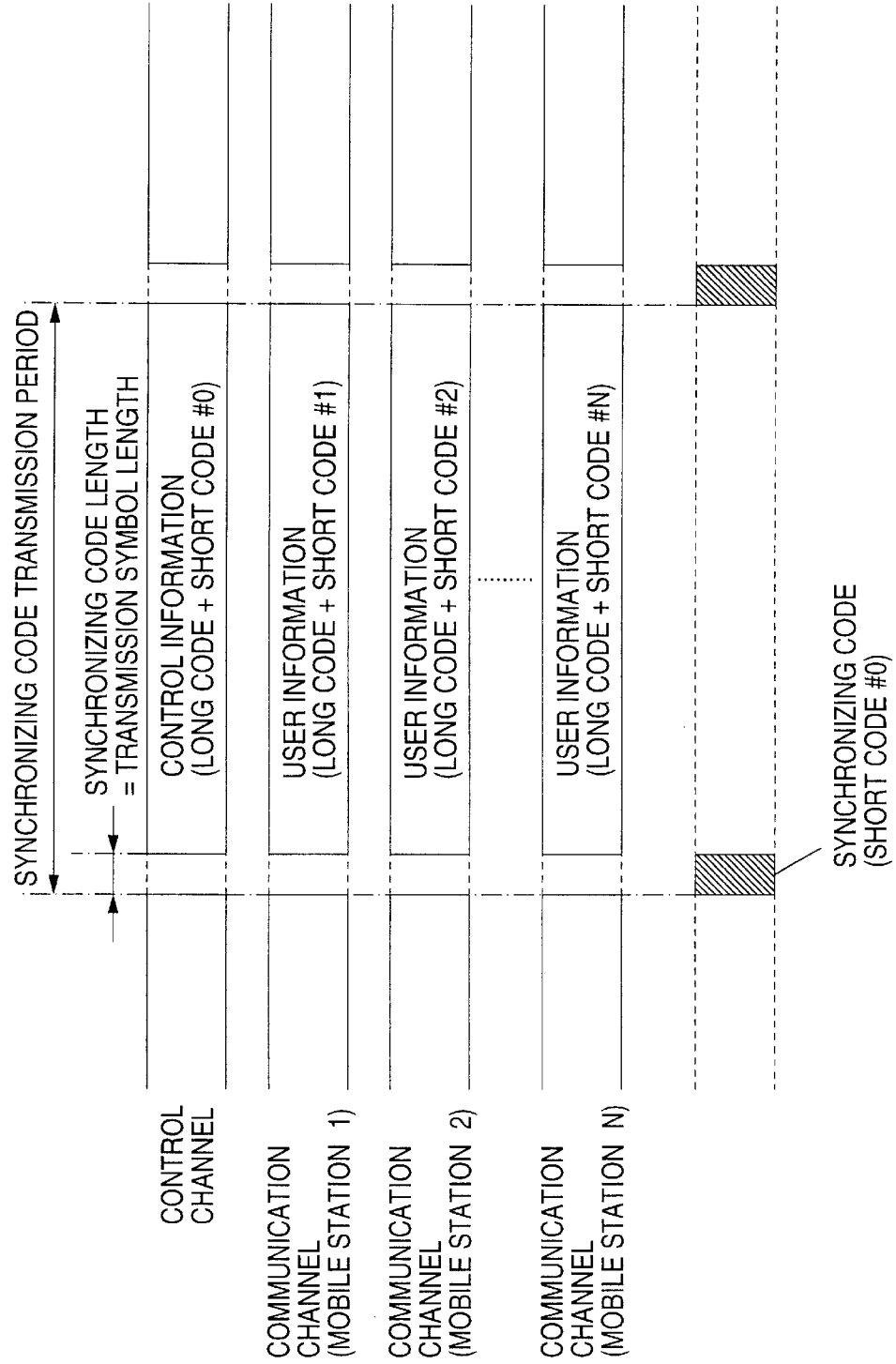
FIG. 2 is a diagram illustrating channel arrangement in a forward link according to the embodiment 1 of the invention.
Figure 3:
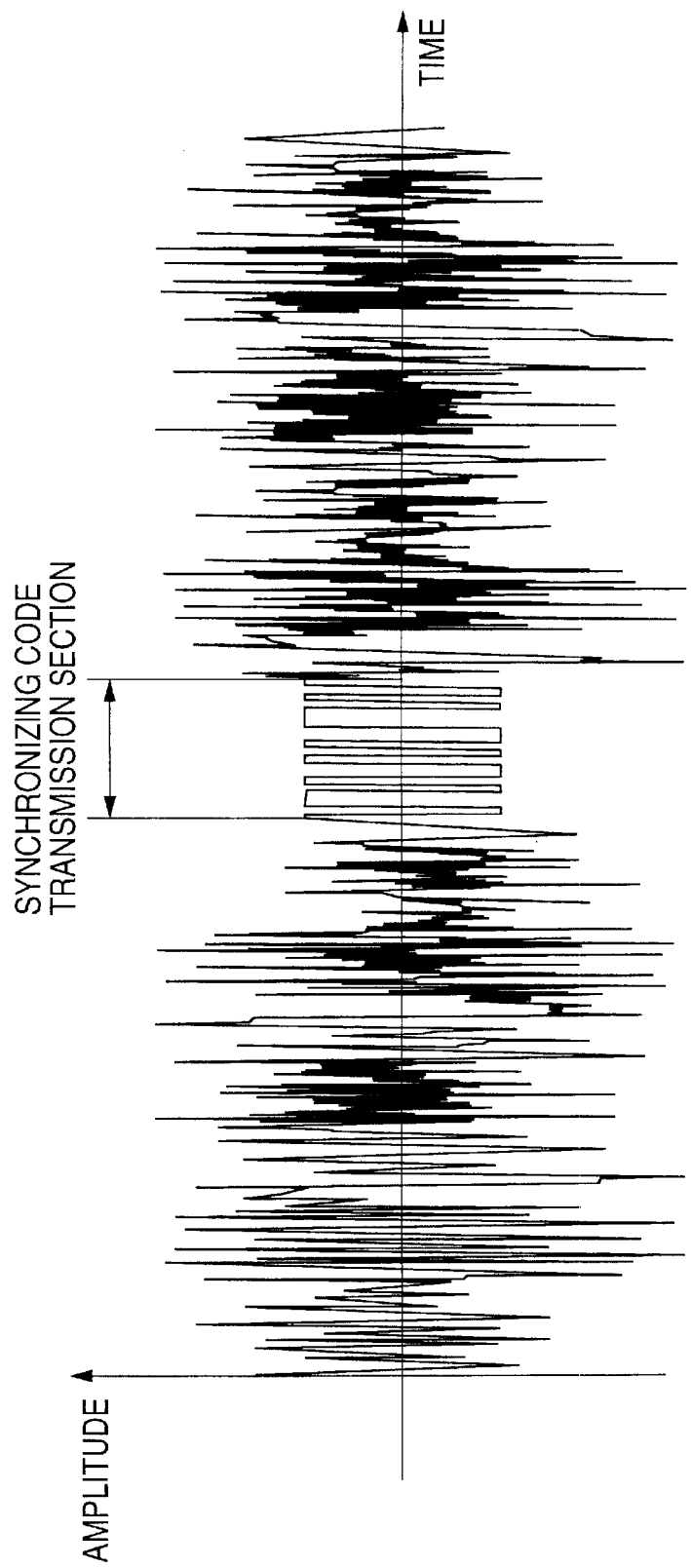
FIG. 3 is a transmission waveform chart at a base station according to the embodiment 1 of the invention;.

A description will subsequently be given of the operation when the initial synchronization is acquired with the above-described arrangement. As shown in FIG. 2, by switching the switch 7 in the base station side equipment 1, a control channel 23 for transmitting control information and a communication channel 24 for transmitting information to each mobile station are spread with different spread codes and the diffused results are superposed. Further, a synchronizing code having a length of one symbol is periodically inserted in a transmission signal. In an example as shown in FIG. 2, the spread codes of the control channel 23 and the communication channel 24 each include common long codes and different short codes added to the former, whereas the synchronizing code 25 employs one of the short codes. Therefore, as shown in FIG. 3, the time waveform of the superposed signal has a constant amplitude in a synchronizing code transmission section and a random amplitude in a section other than the synchronizing code transmission section because the channels of the spread codes different from each other are superposed.

Figure 4:
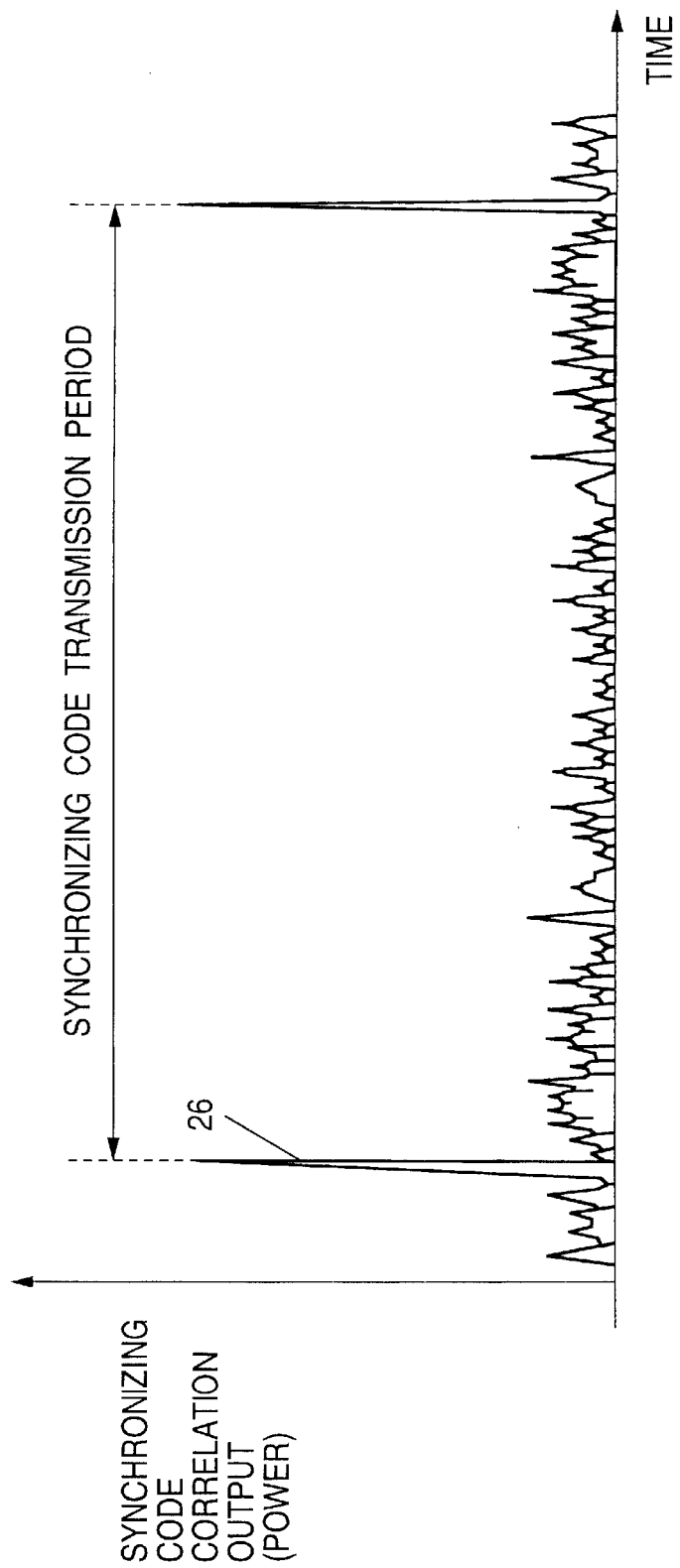
FIG. 4 is a correlative output waveform chart by the synchronizing code of a received signal at a mobile station according to the embodiment 1 of the invention.

When the mobile station side equipment 2 acquires the initial synchronization with respect to the aforementioned signal, the synchronizing correlator 17 detects the correlation value of the whole chip phase with respect to the synchronizing code. A matched filter, a sliding correlator or the like is used as the synchronizing correlator 17. The correlation value is maximized when the chip phase of the received signal coincides with that of the spread code for detecting the correlation. Therefore, as shown in FIG. 4, a sharp auto-correlation peak 26 appears in the output of the synchronizing correlator 17 in every synchronizing code transmission period. Any interference due to the correlation of other channels does not occurs in a multipath environment because no other channels exist in the synchronizing code transmission section within a cell. Accordingly, a highly reliable correlation value corresponding to one symbol is obtainable in view of extracting timing. Since the synchronizing code is prevented from interfering with other channels, moreover, the reliability is made improvable further by setting the transmission power of the synchronizing code greater than power per one other channel. When interference with another cell in the synchronizing code transmission section is taken into consideration, the transmission power of the synchronizing code can be increased up to the sum of power of other channels outside the synchronizing code transmission section. However, in order to minimize the interference by another cell as much as possible, it is preferred to suppress the transmission power of the synchronizing code up to the lowest level at which reliability for extracting the timing with the correlation of one symbol is securable. The synchronizing circuit 19 regards the position where the peak of the correlator output appears as the symbol timing so as to acquire and hold symbol synchronization, and supplies the symbol timing to the reception base-band processing unit 18. The reception base-band processing unit 18 uses the symbol timing supplied from the synchronizing circuit 19 to perform the correlation process with the spread code used for the spread of the channel employed for reception. In order to hold the synchronization, not only the synchronizing code but also the correlation value of the spread code used for the spread of the channel received in any section other than the synchronizing code transmission section. In this case, reliability is securable by subjecting the correlation value to plural symbol integration in each chip phase, because the power of the correlation peak per one symbol is small and interference within the cell exists.

Figure 5:
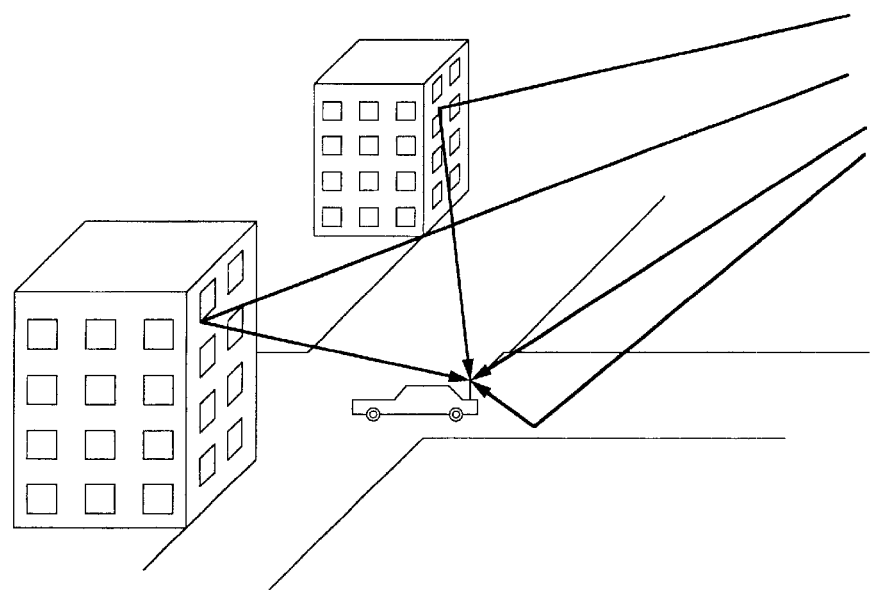
FIG. 5 is a conceptual drawing of a multipath according to the embodiment 1 of the invention.
Figure 6:
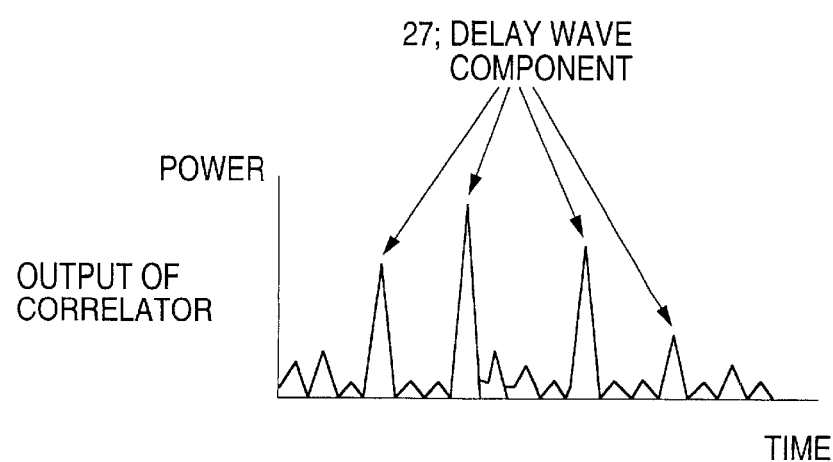
FIG. 6 is a correlative output waveform chart in a propagation multipath according to the embodiment 1 of the invention.

Next, the operation of the mobile station when data is decoded will be described as follows. A mobile communication environment is such that, as shown in FIG. 5, a transmission multipath is created because of diffraction, reflection and the like. In the direct spread CDMA, since each delay wave component 27 constituting the multipulse has a different delay time, it appears as the peak having a peak corresponding to its power as shown in FIG. 6 by the correlation process of the spread code. In the CDMA, the signal versus interference power cost is raised by synthesizing the delay wave components thus separated, and diversity reception with respect to fading which fluctuates independently of the delay wave is attained, whereby communication quality is improved. This is called RAKE synthesis. The delay profile detection circuit 20 detects the position and size of the delay wave with respect to the output of the synchronizing correlator 17, and supplies the detected results to the reception base-band processing unit 18. Delay profile detection with accuracy is made possible even in this case by using the correlation value of the synchronizing code. As the correlation value, not only the synchronizing code but also the correlation value of the spread code used for the spread of the channel employed for reception in any section is used other than the synchronizing code transmission section.

When a phase modulation system and synchronizing detection are used as a modulation and a detection system, respectively, an absolute phase of each delay wave is required to be obtained by the reception side because the phase angle of rotation of the carrier is kept independent on a delay wave basis. The phase estimation circuit 21 estimates the phase angle of each delay wave with respect to the output of the synchronizing correlator 17. Since the polarity of the synchronizing code is fixed, accurate phase estimation is made possible by obtaining the phase angle of the synchronizing code portion.

The reception base-band processing unit 18 uses the timing of each delay wave supplied from the delay profile detection circuit 20 to perform the correlation process on a delay wave basis and the synchronizing detection by means of the phase angle of each delay wave supplied from the phase estimation circuit 21, and make RAKE synthesis by synthesizing the correlation values after the synchronizing detection.

As set forth above, according to the first embodiment of the invention, the correlation value of the synchronizing code is used by the mobile station by periodically inserting the synchronizing code with a length of one symbol in the transmission signal, whereby the symbol synchronization can be acquired at high speed. Moreover, accurate delay profile detection and accurate phase estimation are also possible.

Embodiment 2

A spectrum spread communication system as a second embodiment of the invention is similar to the first embodiment as shown in FIG. 1 except the processing method which is LBD different from the first embodiment. A plurality of base stations according to this embodiment of the invention employ the same spread code as a synchronizing code with the same synchronizing code transmission period, synchronizing code transmission timing being independently asynchronous at each base station.

Figure 7:
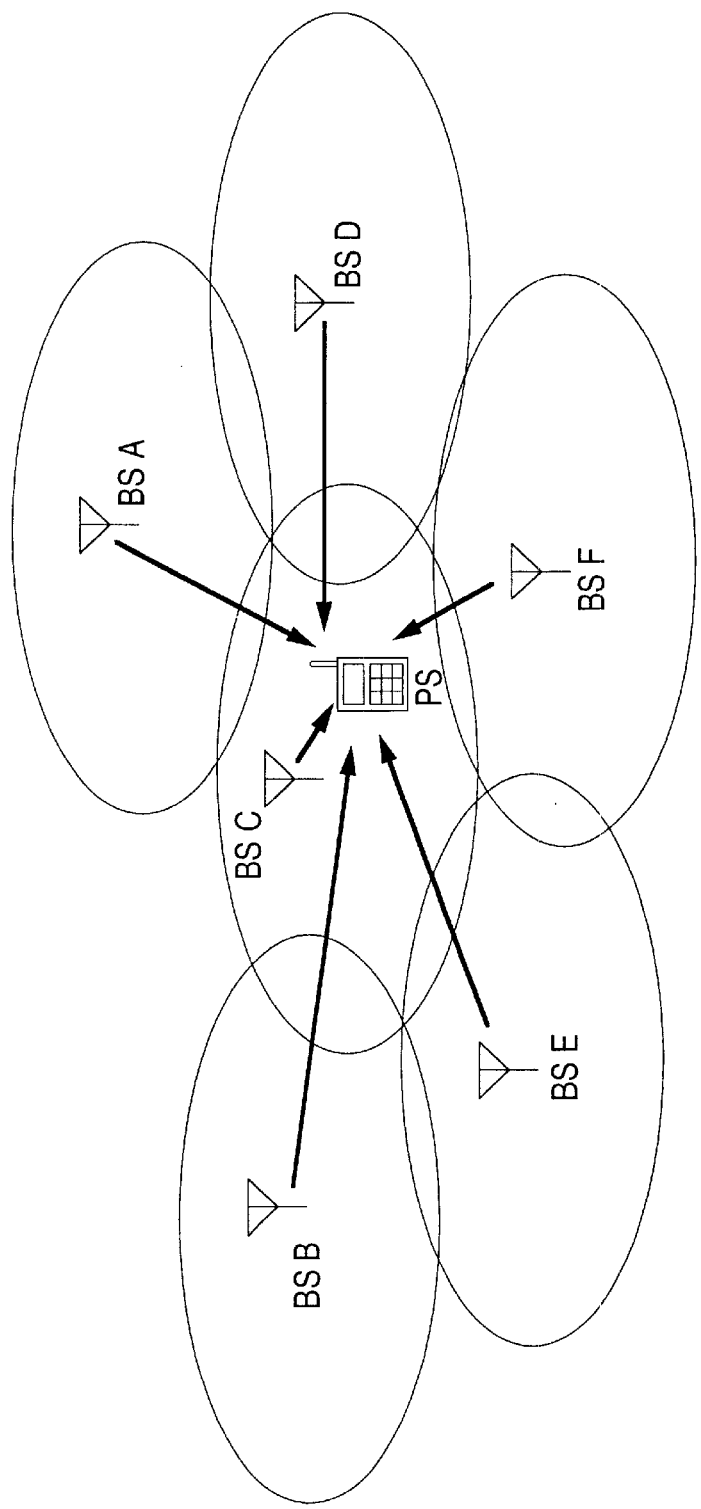
FIG. 7 is an arrangement of the base station and the mobile station explanatory of the operation of deciding a call range according to embodiment 2 of the invention.
Figure 8:
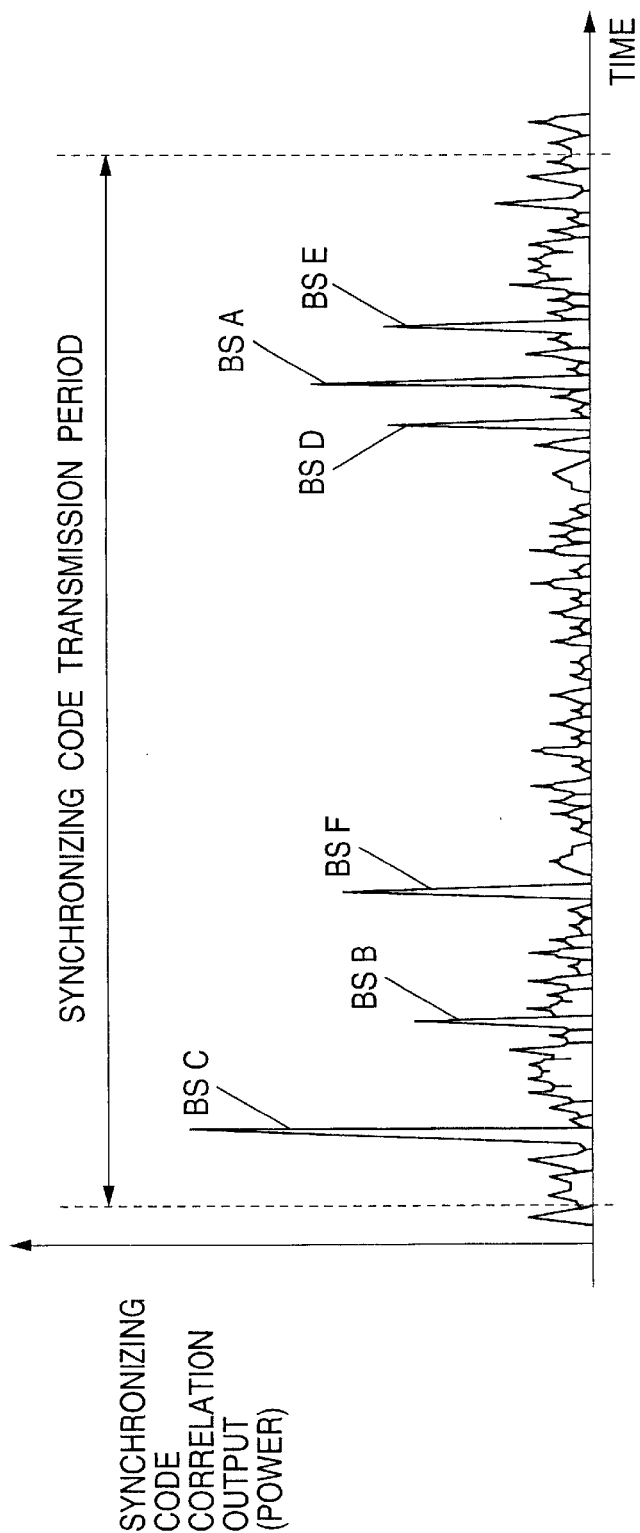
FIG. 8 is a correlative output waveform chart by the synchronizing code of a received signal at a mobile station shown in FIG. 7.

The operation when power is supplied to a mobile station PS in such an environment as shown in FIG. 7 will be described. The synchronizing correlator 17 obtains the correlation value of a synchronizing code with respect to the whole chip phase in the synchronizing code transmission period and supplies the result to the synchronizing circuit 19. Since the synchronizing code and the synchronizing code transmission period of the whole base station are the same, an auto-correlation peak resulting from the synchronizing code from the base stations (BS A, BS B, BS C, BS D, BS F, BS E) in the proximity of the mobile station PS appears at the output of the correlator in the synchronizing code transmission period as shown in FIG. 8. Since the synchronizing code transmission timing of each base station is independent, if a synchronizing code transmission period is set greater to a certain extent, it can be ignored in view of probability that the different kinds of synchronizing code transmission timing of any two base stations coincide with each other within one chip, that is, the auto-correlation peaks of any two base stations are overlapped. In the case as shown in FIG. 8, the power received from a base station BS C which is closest to a mobile station PS becomes greatest. Accordingly, the synchronizing circuit 19 decides that the base station BS C which transmits a synchronizing code at timing with the highest peak out of the auto-correlation peaks is the closest base station. Then, the synchronizing circuit 19 carries out symbol synchronization as in the first embodiment of the invention with the timing at this peak as symbol timing.

As set forth above, according to the second embodiment of the invention, the synchronizing code and the synchronizing code transmission period of the whole base stations are made equal, and the synchronizing code transmission timing of the whole base stations are made independently asynchronous. Accordingly, it is possible to quickly conduct a call range decision by selecting the highest peak out of the correlation values within the synchronizing code transmission period in a mobile station. Moreover, even in a system in which the timing synchronization is performed among the base stations, the synchronizing code transmission sections are set so as not to be overlapped at the base stations situated close to each other, thereby obtaining the same effect.

Embodiment 3

A spectrum spread communication system according to a third embodiment of the invention is similar to the first embodiment as shown in FIG. 1 except the processing method which is different from the first embodiment. The channel construction of the down transmission line of the base station is similar to what is shown in FIG. 2. In all of base stations according to the present embodiment, the same spread code is used as a synchronizing code having the same code transmission period, and the synchronizing code transmission timing is asynchronous at each station. As a long code used by a base station for transmission, moreover, one base station uses only one kind of long code for transmission, and different ones are allocated to the base stations situated close to each other. Further, a long code length conforms to a synchronizing code transmission period, and the leading end of the long code conforms to the transmission position of the synchronizing code. Moreover, all kinds of long codes and short codes of control channels that are allocated to base stations are those which have been made known.

With the above arrangement, since the method of making a decision on the call range when power is supplied to a mobile station and a symbol synchronizing method are similar to those in the second embodiment, a description will be given of the operation when long code synchronization is acquired after the symbol synchronization is acquired and when data in the control channel 23 of FIG. 2 is received.

The length and leading end position of the long code correspond to the synchronizing code transmission period and a synchronizing code transmission position, respectively. Accordingly, a mobile station is already in possession of the timing of long code when the symbol synchronization is acquired. Therefore, the acquisition of the long code is completed if the kind of long code used at the base station is specified. The synchronizing circuit 19 in the mobile station obtains the correlation value of a code resulting from adding up the short code of the control channel and the whole long code allocated to the base station by using the timing obtained from the correlation value of the synchronizing code. Then, the synchronizing circuit 19 decides a long code with the maximized correlation value to be the long code used at the base station and further notifies the reception base-band processing unit 18 of the long code thus decided. The reception base-band processing unit 18 then obtains reception data by performing correlation process, detection, RAKE synthesis and decoding by using the long code thus notified.

As set forth above, in the third embodiment, one kind of long code is used by one base station as the long code used by the base station for transmission, and different ones are allocated to the base stations situated close to each other. Further, it is also arranged to make long code length conform to the synchronizing code transmission period and make the leading end of the long code conform to the synchronizing code transmission position. Moreover, all kinds of long codes and short codes of control channels that are allocated to base stations are those which have been made known. Correlation detection of the whole long code allocated to the base station is made by using the synchronizing code transmission period and timing obtained by making the correlation detection of the synchronizing code. The long code with the maximized correlation value is decided to the long code of the base station to acquire the long code synchronization, whereby the long code synchronization can be acquired even in an inter-cell asynchronous system without requiring any installation design. Moreover, acquisition of long code synchronization is possible likewise even in an inter-cell synchronizing system for carrying out inter-cell timing synchronization.

Embodiment 4

Figure 9:
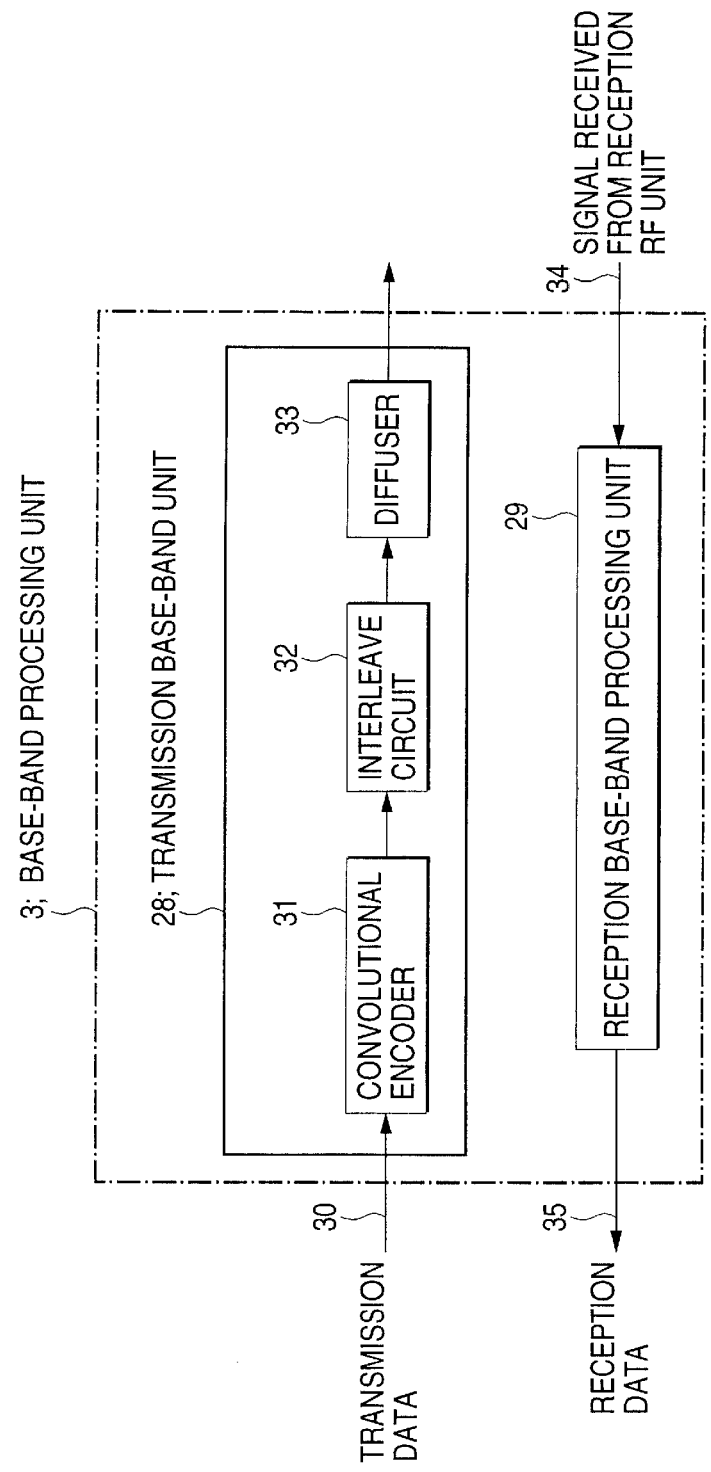
FIG. 9 is a block diagram illustrating a base-band processing unit at a base station according to embodiment 4 of the invention.

A spectrum spread communication system in a fourth embodiment of the invention is similar to the first embodiment as shown in FIG. 1 except the method of transmitting receiving information in the forward link using a communication channel which is different from the first embodiment. FIG. 9 shows the structure of the base-band processing unit 3 of the base station side equipment 1 in FIG. 1, and FIG. 10 shows the structure of the reception base-band processing unit 18 of the mobile station side equipment 2 in FIG. 1. As shown in FIG. 9, the base-band processing unit 3 has a transmission base-band unit 28 and a reception base-band processing unit 29. In the transmission base-band unit 28, transmission data 30 is convolutionally encoded into an error correcting code in a convolutional encoder 31, the temporal ordering of data string is replaced in an interleave circuit 32 and the spread process is performed with the spread code allocated by a diffuser 33, so that data is supplied to the adder 5 of FIG. 1. On the other hand, the reception base-band processing unit 29 receives a signal received from the reception RF unit 10 and outputs reception data 35.

In the reception base-band processing unit 18 of the mobile station side equipment, a correlator 37 subjects, as shown in FIG. 10, the signal 36 received from the reception RF unit 16 to the correlation process using the same spread code as the spread code used in the diffuser 33 of the base station side equipment. Further, a deinterleave circuit 38 restores to the original condition the time order of data replaced in the interleave circuit 32 of the base station side equipment. A punctured Viterbi decoder 39 decodes convolutional codes so as to obtain reception data 40.

With the arrangement above, since the operation of acquiring the initial synchronization is the same as in the first embodiment of the invention, a description will be given of a method of transmitting/receiving information in the forward link using the communication channel after the acquisition of the initial synchronization. Redundancy is added by the convolutional encoder 31 to the transmission data 30. As shown in FIG. 2, the data originally intended for transmission is not transmitted in the synchronizing code transmission section, because the synchronizing code is transmitted by switching the data originally intended for transmission by means of the switch 7 of FIG. 1. Therefore, the redundancy of the convolutional code is reduced by the number of synchronizing code transmission symbols but this can be considered a punctured convolutional code. The punctured code is normally used to adjusting the number of data (coding ratio) before and after coding the error correcting code, which is obtained by removing a suitable number of redundant sequences form the data after original coding. Although the redundancy reduction through the above process depends on the synchronizing code transmission period and the synchronizing code section, it is approximately 1–6 symbols in the synchronizing code section, and it can be almost disregarded by setting the synchronizing code transmission period, that is, the long code period sufficiently greater.

The synchronizing code position of the received signal 36 from the reception RF unit 16 has been known to the punctured Viterbi decoder 39 of the reception base-band processing unit 18 of the mobile station. Accordingly, the punctured Viterbi decoding without using the received signal in the synchronizing code section is performed to decode the received data.

When the data transmitted to each mobile station from the base station is of frame structure, since the synchronizing code section differs according to the base station, handover is effected by switching the base station from one to another as the position of the mobile station changes so as to switch the relative position in the frame of the synchronizing code section each time the base station is switched over in the inter-cell asynchronous system. The aforementioned case can be dealt with relatively simply by only altering a section which is not to be used as the received signal in the punctured Viterbi decoder 39. Thus the decoding process can be performed without increasing the complexity thereof.

As set forth above, according to the fourth embodiment of the invention, the base station is provided with the error correcting coding means with respect to the information transmitted to the plurality of mobile stations and means of transmitting the synchronizing code by replacing part of the data that has been subjected to the error correcting coding, whereas the mobile station is provided with means of effecting punctured decoding without using the received data corresponding to the synchronizing code transmission section for decoding with respect to the received error correcting code. Thus the data transmitted to each mobile station from the base station is of frame structure and even when the frame timing is independent among the mobile stations and even when the relative position with respect to the frame of the synchronizing code differs according to the mobile station, the decoding process can be performed without increasing the complexity thereof.

As set forth above, the synchronizing code is periodically transmitted and the synchronizing code transmission period and the long code synchronization are equalized and further the synchronizing code transmission position and the leading end of the long code are made to conform to each other. The mobile station obtains the correlation value with respect to the whole phase in the synchronizing code transmission period so as to acquire the long code synchronization by making the call range decision and the symbol synchronization from the phase with the greatest correlation value, whereby the symbol synchronization and the call range decision can be made quickly. Even in the inter-cell asynchronous system wherein installation design is unnecessary and the cell recognition is carried out with the long code synchronization, the long code synchronization can be acquired.

What is claimed is:

1. A spectrum spread communication system comprising:
   a plurality of base stations including communication means utilized for a direct spread CDMA method as a multiple access method; and
   a plurality of mobile stations including communication means utilized for the direct spread CDMA method as the multiple access method,
   wherein said each base station includes transmission means for transmitting a spectrum-spread synchronizing code periodically during a term of synchronizing code transmission section and for transmitting spectrum-spread user information and spectrum-spread control information during a predetermined interval between said terms of synchronizing code transmission section, and
   wherein said each mobile station includes means for acquiring symbol synchronization of said base stations by detecting correlation of said synchronizing code.

2. The spectrum spread communication according to claim 1,
   wherein kind of synchronizing codes is common among all said base stations and a common transmission period is utilized in all the base stations,
   wherein said each base station transmits the synchronizing code at different timing from each others, and
   wherein said each mobile station detects the correlation of said synchronizing code over the whole phase of the synchronizing code transmission period to determine a closest base station which transmits the synchronizing code whose correlation value is the highest.

3. The spectrum spread communication system according to claim 1,
   wherein sequence of synchronizing codes is common among all said base stations and a common transmission period is utilized in all the base stations,
   wherein synchronizing code transmission timings are prevented from being overlapped at least at adjoining base stations, and
   wherein said each mobile station detects the correlation of said synchronizing code over the whole phase of the synchronizing code transmission period to determine a closest base station which transmits the synchronizing code whose correlation value is the highest.

4. The spectrum spread communication system according to claim 1,
   wherein said spectrum-spread control information is spread by a combination of short code and a long code,
   wherein symbol length of said short code is equal to a synchronizing code length and symbol length of said long code is longer than that of said short code,
   wherein a long code period is equal to a synchronizing code transmission period,
   wherein said synchronizing code is transmitted at a leading end of said long code period, and
   wherein each mobile station acquires long code synchronization by using the synchronizing code transmission period and a timing obtained by detecting the correlation of the synchronizing code.

5. The spread spectrum system according to claim 1,
   wherein said transmission means transmits said synchronizing code and spectrum-spread control information serially and alternatively in a channel, and
   wherein said transmission means transmits said synchronizing code and spectrum-spread user information corresponding to each user serially and alternately in each channel corresponding to each user.

* * * * *

UNITED STATES PATENT AND TRADEMARK OFFICE
CERTIFICATE OF CORRECTION

PATENT NO. : 6,765,895 B1  
DATED : July 20, 2004  
INVENTOR(S) : Masatoshi Watanabe It is certified that error appears in the above-identified patent and that said Letters Patent is hereby corrected as shown below:

Column 2,  
Line 37, after "need" please delete "no".

Column 3,  
Line 42, after "base station" please delete "to".  
Line 42, please delete "communicates" and insert therefor -- communicate --.  
Line 62, please delete ".10" and insert there for -- 10 --.  
Line 67, after "RF unit" please insert therefor -- 10 --.

Signed and Sealed this

Nineteenth Day of October, 2004

JON W. DUDAS  
*Director of the United States Patent and Trademark Office*